Figure 1:
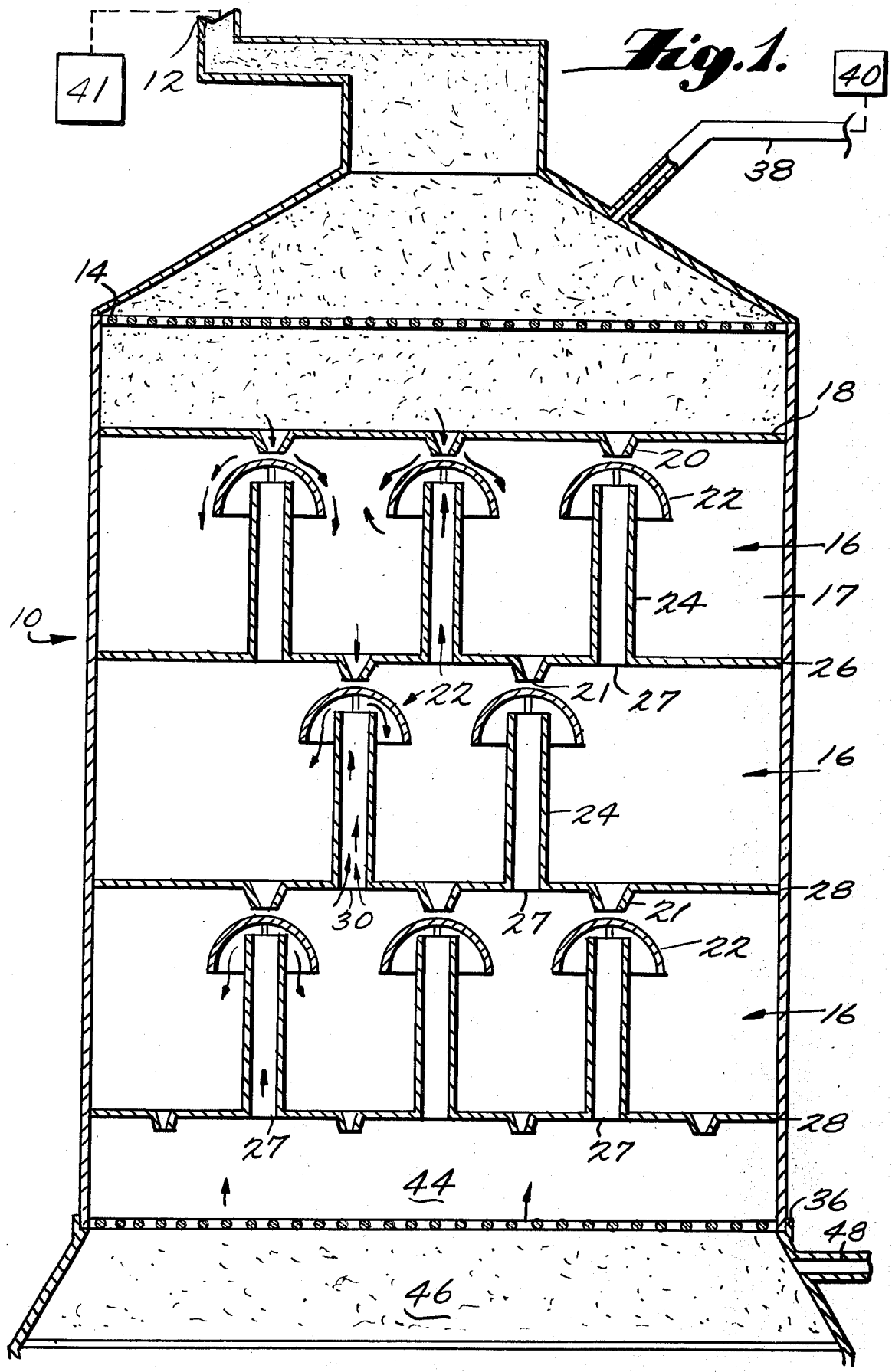

United States Patent [19]
Bjerg

[11] 3,985,625
[45] Oct. 12, 1976

[54] ALCOHOLIC BEVERAGE STILL WITH DOMED CONDUITS FOR VAPOR FLOW AND FRUSTUM APERTURES FOR CONCURRENT VAPOR/LIQUID FLOW

[76] Inventor: Miguel J. Fernandez Bjerg, 652 Hernandez St., Muamar, P.R. 00907

[22] Filed: Feb. 28, 1975

[21] Appl. No.: 554,183

[52] U.S. Cl. .................... 202/158; 203/DIG. 13; 261/113; 261/114 R
[51] Int. Cl.² .................................................. B01D 3/14
[58] Field of Search .................... 202/158, 162; 261/114 A, 114 R, 113; 203/DIG. 13

[56] References Cited
UNITED STATES PATENTS

| | | | |
|---|---|---|---|
| 1,806,090 | 5/1931 | Seguy | 261/114 R |
| 2,698,746 | 1/1955 | Reynolds | 261/114 R |
| 3,325,155 | 6/1967 | Bahout | 261/113 |

FOREIGN PATENTS OR APPLICATIONS

| | | | |
|---|---|---|---|
| 14,873 | 2/1856 | France | 202/158 |

Primary Examiner—Frank W. Lutter
Assistant Examiner—Frank Sever
Attorney, Agent, or Firm—Gipple & Hale

[57] ABSTRACT

A fractionating column for distilling liquor constructed as a vertical walled structure having inlet and outlet conduits. Inside the vertical walled structure is a perforation plate horizontally mounted across the walled structure, a first feed plate defining feed openings horizontally extending across the structure below the perforation plate, a second feed plate positioned below the first feed plate defining a plurality of feed openings and a plurality of conduit openings, and a plurality of conduits secured to the second feed plate. Each of the conduits is positioned around one of the conduit openings and opposite the feed openings of the next highest feed plate, with a plurality of inverted cup shaped members being mounted to the conduits, and positioned between the conduits and feed openings.

9 Claims, 2 Drawing Figures

U.S. Patent  Oct 12, 1976  Sheet 1 of 2  3,985,625

ALCOHOLIC BEVERAGE STILL WITH DOMED CONDUITS FOR VAPOR FLOW AND FRUSTUM APERTURES FOR CONCURRENT VAPOR/LIQUID FLOW

The present invention relates to imrovements in the art of distilling spirit liquors through fractional distillation involving the exchange of materials between gases and liquids. While the invention is applicable to distilling of wines and beers, the invention described is directed to the distilling of harder liquor, namely, rum. At the present time distilling processes are largely employed using the batch process and the continuous process. In the batch process a large quantity of distiller's beer is placed in a batch or chamber and stripped of its alcohol and other volatile components by steam which is introduced at the bottom of the still passing upwardly throughout the full length of the batch causing the beer to boil and the alcohol to be driven off.

The continuous process was developed to reduce stripping time and steam consumption, over that used in the batch process and to increase capacity and provide more accurate control of stripping conditions to the end of securing a more uniform product. In the continuous process, a stream of distiller beer is continuously fed to the top of a fractionating column or tower having a superimposed series of fractionating spaced perforated plates. A shallow bath of uniform depth is formed on the top perforated plate which continuously overflows through a down pipe to form a similar bath on the next plate repeating itself through the depth of a column so that the liquid is stripped of its alcohol and other volatile components by steam which is introduced at the bottom of the column. The stream passes upwardly through the perforations of stacked plates causing the batch on each plate to boil so that the bath to releases its alcohol and other volatile materials. Since accurate control is maintained, continuous still whiskeys are chemically similar and uniform.

Continuous still liquor was not originally intended to differ from charged or batch still whiskey in any respect except uniformity. As a matter of fact liquors produced by both processes are so chemically alike it is extremely difficult to determine any significant chemical differences between them. Nevertheless, they differ widely in body, odor and texture with charge still liquor being definitely "heavy" and continuous still liquor being definitely "light" in these respects. Since the lighter liquor is considered as being free of impurities it is generally desired to produce lighter liquors.

In the present case, the desire is to produce a lighter rum and the product of a lighter uniform rum forms the principal subject of this invention. Temperature is an important factor in the stripping operation, and it has been found that lightness of a continuous still product will increase as the maximum temperature of the distilled beer or mash is reduced. Furthermore, the lightness is measurably increased when the maximum boiling temperature is held below the temperature of the mash at its entry in the still with the temperature of the still not being allowed to exceed the original boiling temperature of the mash.

The invention, therefore, provides a continuous stripping operation of the mash in the inventive fractionating column to produce a maximum quantity of consistent quality liquor from a minimum amount of mash liquid at reduced temperatures.

The novel construction of the invention also significantly decreases entrainment of the liquid in the vapor rising from one stage to the next.

Figure 2:
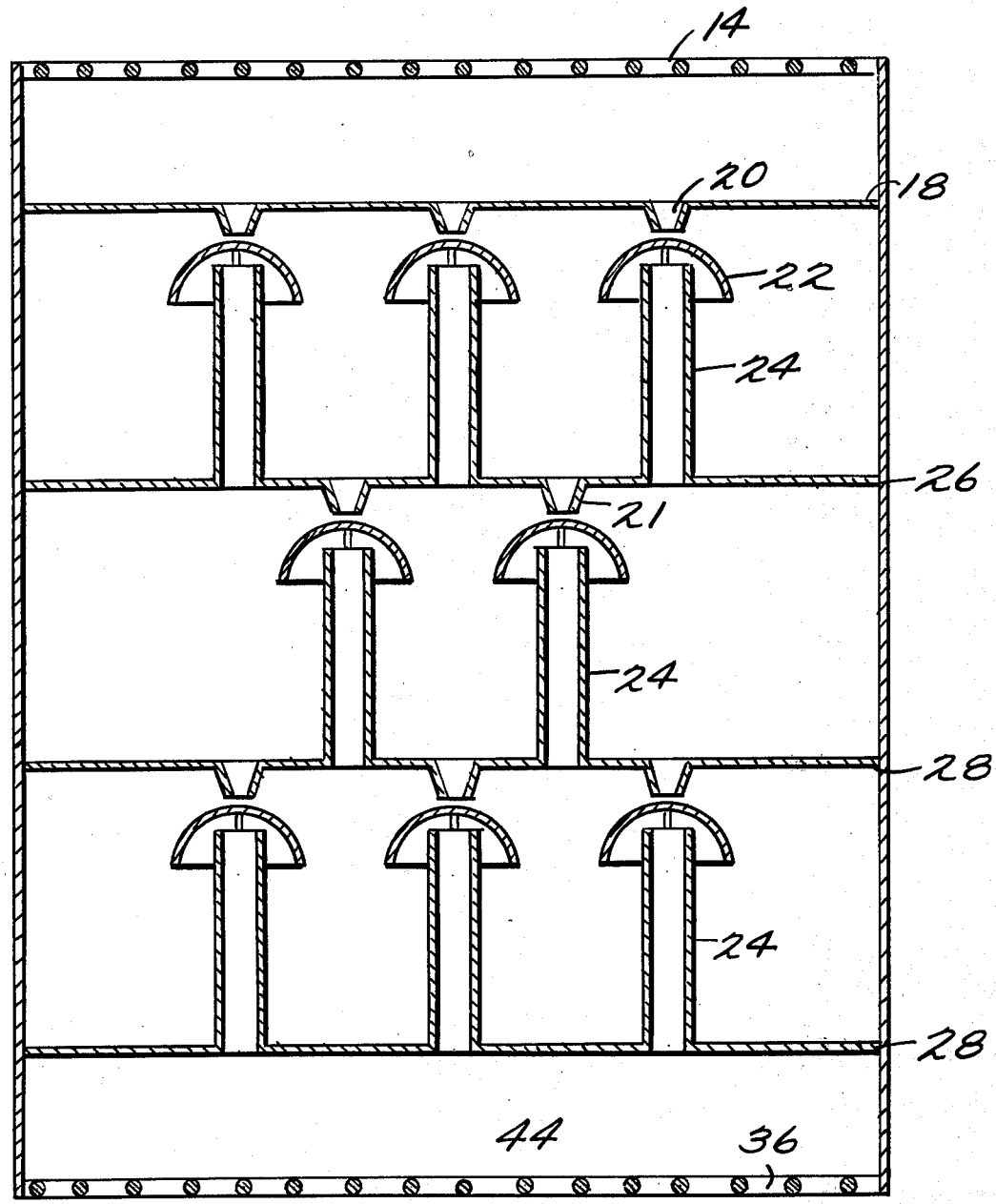

The present invention is illustrated in the accompanying drawings wherein:

FIG. 1 is a schematic diagram of a continuous brewing still arranged for operation in accordance with the invention and, FIG. 2 is an enlarged diagram of the fractionating column of the distilling apparatus disclosed in FIG. 1.

The present invention as shown in FIGS. 1 and 2 comprises a fractionating column 10 having outlet vapor 12. The fractionating column 10 has at least one vertically spaced horizontally arranged perforation plate 14. Positioned beneath the perforation plate 14 are vertically spaced horizontally arranged vapor contact stages 16. The highest vapor contact stage 14 comprises a top horizontal feed plate 18 defining a plurality of spaced downwardly extending mash feed conduits or perforations 20. The mash feed conduits 20 (alternately referred to as transfer openings or apertures) perferable have a truncated cone shape. Each of the feed conduits 20 empties the mash or liquid onto an inverted hemispherically shaped cup member 22 which is positioned under each of the feed conduits. The inverted cup member 22 is secured to the column wall or a vapor transfer conduit so that it is positioned over the vapor transfer conduit 24. The vapor transfer conduit is secured to the top of the feed plate 26 around a vapor bore 27 cut through feed plate 26. The feed plate 26 defines a plurality of mash feed conduit 21 formed like perforations 20.

Additional vertically spaced horizontally arranged feed plates 28 are constructed identically to feed plate 26 and defined throughgoing bores 27 over which the vapor transfer conduits 24 are secured to allow the upward rising vapor 30 to communicate with the next higher stage while feed perforations 21 let the liquid mash fall into the next lower stage.

The gas contact stages are arranged in such a way that there is a counter current flow of the vapors and liquid through the stages. The upwardly flowing vapor flows through the transfer conduits 24 into the inverted cup members 22 where the velocity of the vapor is slowed down because of the serpentine shaped flow path it is forced to take. The mash liquid on each plate is thoroughly mixed with the vapor leaving each plate so that the vapor with its particular volatile compounds is in equilibrium with the liquid on the plate. Steam can be admitted into the bottom of the fractionating column or still through a sparge pipe. This steam heats the lowest bath of heated mash at the bottom of the column causing the liquid in the mash to vaporize up through the bottom perforated feed plate 36 and pass through the vapor contact stages until the vapor passes through the upper perforated plate 14 and mash passing through the upper perforated plate up into a high wine or liquor vapor outlet connection 12 for cooling the vapor to liquid and carrying the liquid off to a suitable receiver.

The reaction of the controlled heated vapor rising from the lower areas hits the interior of the inverted cup areas over which the mash is flowing from above causing the fractioning of the falling liquids according to their boiling point.

In operation of the invention pre-heated mash 40 enters through inlet pipe 38. From this point the preheated mash falls through performations or conduits of feed plate 18 onto the top of inverted cup members 22 spraying the liquid mash. As the mash sprays down to the floor of the next feed plate 26 it is subjected to the heated rising vapors passing through conduits 24 from the next lower stage. The mash passes through several stages having identical structure into area 44 at the bottom of the column formed by the bottom surface of the last feed plate 28 and the upper surface of the lower perforated plate 36. The mash flows through the perforations into a pot still area 46 at the bottom of the column. The left over mash filters out through the pipe 48 at the lower right hand corner of the still. Simultaneously with the above filtering of the mash from the strip area vapor rises from the lower area 46 and the other stages and filters through conduits 24 and perforations 20 of the aforementioned stages escaping in the form of alcoholic vapor through tube 12 to the condenser 41.

In summarization the reaction of the heated rising vapor heats the interior cup areas over which the liquid falls according to its respective boiling point.

Since the liquid is boiling or close to boiling on each feed plate and at the bath at the bottom of the column, the vapor is continually generated and passed upward through the liquid vapor tube 12 into the condenser 41.

While the referred embodiment of the invention has been disclosed, it is understood that the invention is not limited to such an embodiment since it may be otherwise embodied in the scope of the appended claims.

What is claimed is:

1. A fractionating column for distilling liquid comprising a vertical walled structure defining inlet means and outlet means, a perforated plate means horizontally mounted across said walled structure, a first feed plate defining a plurality of transfer openings horizontally extending across said walled structure below said perforated plate means, a second feed plate horizontally extending across said walled structure and positioned below said first feed plate, said second feed plate defining a plurality of vapor feed openings and a plurality of transfer openings, a plurality of conduits communicating with said second feed plate in alignment with the vapor feed openings, each of said conduits being positioned around one of said feed openings to allow vapor to pass therethrough into a chamber formed by the walls of said vertical structure and said first and second feed plate, and a plurality of inverted cup shaped members having their concave surfaces mounted above said conduits and positioned between said conduits and said transfer openings so that said transfer openings are positioned exactly over the top of said inverted cup shaped members to form a serpentine flow path for vapor rising through said conduits and said transfer openings.

2. A fractionating column as claimed in claim 1, including a third feed plate defining a plurality of transfer openings and a plurality of vapor feed openings, a plurality of conduits secured to third feed plate, each of said conduits communicating with one of said vapor feed openings directly below the transfer openings of the next highest feed plate.

3. A fractionating column as claimed in claim 2 including a second perforated plate horizontally mounted across said vertical column below said feed plates, said second perforated plate being adapted to hold liquid mash and transmit gases from a pot still area positioned below said second perforated plate up into said fractionating column.

4. A fractionating column as claimed in claim 1, wherein each of said inverted cup shaped members is hemispherical in shape with curved inner and outer walls and is connected to a conduit.

5. A fractionating column as claimed in claim 1, wherein each of said transfer openings comprise a downwardly projecting truncated cone.

6. A fractionating column as claimed in claim 1 wherein each of said vapor feed openings is an aperature defined by said feed plate having a diameter which does not exceed the diameter defined by the inside wall of each of said conduits.

7. A fractionating column with a continuous downward flow of liquid comprising a vertical walled structure defining inlet means and outlet means, a first perforated plate horizontally mounted across said wall structure, a plurality of distillation stage means mounted across said walled structure below said perforation plate, each of said distillation stage means comprising a top plate defining fluid transfer means, a second plate mounted below said top plate defining conduit entrance apertures and fluid transfer apertures, a plurality of conduits vertically mounted to said second plate over said entrance apertures, said conduits being axially aligned with said fluid transfer apertures a plurality of inverted cup shaped members centered and axially mounted over said conduits, each cup shaped member being adapted to distribute fluid over its outer surface received from the fluid transfer aperatures of the plate immediately positioned above while defining a serpentine flow path for gases passing from the lower stage through at least its associated conduit and transfer aperture, each of said inverted cup members comprising arcuate external and internal surfaces so that the reaction of the controlled heated gases rising from a lower stage heats the interior of the inverted cup area over which the fluid is flowing from above causing the fractionating of the downward flowing liquids.

8. A fractionatiang column as claimed in claim 7 wherein the plurality of conduits of one stage means are offset from the plurality of conduits of the adjacent stage means.

9. A fractionating column as claimed in claim 7 wherein the fluid transfer means of said top plate comprises at least a plurality of downwardly projecting truncated cones.

* * * * *